United States Patent Office.

T. E. CURTISS, OF TITUSVILLE, PENNSYLVANIA.

Letters Patent No. 78,189, dated May 26, 1868.

---

IMPROVED LUBRICATING-COMPOUND.

---

The Schedule referred to in these Letters Patent and making part of the same.

---

TO ALL WHOM IT MAY CONCERN:

Be it known that I, T. E. CURTISS, of the city of Titusville, county of Crawford, and State of Pennsylvania, have invented a certain new and useful Lubricating-Compound, for lubricating carriage-axles, journals, &c.; and I do hereby declare that the following is a full, clear, and exact description thereof, from which any person skilled in the art may be able to compound and use the same.

My compound is very simple, cheap, and easily made, and requires but little description. It is intended especially for lubricating carriage and car-axles, but may be used to equal advantage in nearly all cases where an efficient and cheap lubricator is needed. It is made from the residuum of crude petroleum or coal-oil, as a base, with the addition of finely-bolted rye flour.

For summer use, I make it in the proportion of one gallon of residuum to about one pound of the rye flour. The residuum should be moderately heated before the flour is added, and the latter sifted and stirred in until all is thoroughly mixed.

For use in cold weather, only about one half the above quantity of flour will be required; the said proportion being slightly varied from the above, according to the temperature or climate, and the particular use for which it is intended.

The rye flour being in itself a good lubricator, gives sufficient stiffness or "body" to the residuum to prevent it from spreading and dripping from the axles, while at the same time it serves to prevent both the axle and the lubricator from becoming heated.

Having thus described my compound, what I claim as my invention, and desire to secure by Letters Patent, is—

The within-described lubricating-compound, composed of the materials and substantially in the proportions set forth.

T. E. CURTISS.

Witnesses:
  A. B. HOWLAND,
  J. J. HOLDEN.